April 14, 1970 G. W. PALMER ET AL 3,505,831
FLEXIBLE SHAFT COUPLER
Filed July 5, 1968

INVENTORS,
GERALD W. PALMER
REX E. BEACH

BY Greist, Lockwood,
Greenawalt & Dewey.

ATTORNEYS.

United States Patent Office 3,505,831
Patented Apr. 14, 1970

3,505,831
FLEXIBLE SHAFT COUPLER
Gerald W. Palmer, Chicago, and Rex E. Beach, Aurora, Ill., assignors to Skil Corporation, Chicago, Ill., a corporation of Delaware
Filed July 5, 1968, Ser. No. 742,761
Int. Cl. F16c 1/06
U.S. Cl. 64—4        2 Claims

ABSTRACT OF THE DISCLOSURE

A cylindrical housing has its opposite ends adapted for threading engagement with fittings on respective ends of the outer casings of a pair of flexible shafts. This housing has a central, through bore. An elongated, cylindrical coupling member has its opposite ends arranged for driving engagement with respective flexible driving shafts contained within such casings. The outside diameter of the coupling member is less than the diameter of the coupling member to an extent resulting in the former being loosely received within the latter for free rotation therein and for limited lateral movement relative thereto. The engagement between the surface of such bore and outer surfaces of the coupling member serve as the sole means rotatably supporting the coupling member.

BACKGROUND OF THE INVENTION

Heretofore, flexible shaft couplers of the type under consideration have included a cylindrical housing with a coupling element rotatably mounted therein by the use of conventional bearings of the ball, roller, or needle type, for example. As is known to those skilled in the art, such housing has its opposite ends connected to the outer casings of respective ends of a pair of flexible shafts. The coupling element has its opposite ends respectively connected in driving engagement with the flexible shafts contained within such casings.

A number of problems have arisen with the use of such flexible shaft couplers. These couplers have caused a not inconsiderable power loss due to friction in the bearings rotatably supporting the coupling element. The development of such friction has also caused heat problems in the use of these couplers. Problems have also arisen in endeavoring to maintain proper lubrication in the bearings which rotatably support the coupling element within the housing.

The present invention has resulted from the discovery that a flexible shaft coupler of superior characteristics could be constructed by rotatably supporting the coupling element within the housing without the use of bearings of any kind, and by providing the coupling element or member with a diameter less than the diameter of the bore in the housing to a degree resulting in the coupling element being loosely received within such bore for free rotation therein and for limited lateral movement relative thereto, the engagement between the surface of the bore and the outside surfaces of the coupling element serving as the sole means rotatably supporting the latter.

OBJECTS OF THE INVENTION

A primary object of the present invention is the provision of a new and improved flexible shaft coupler which obviates the use of bearings of any type.

Another object of the present invention is the provision of a new and improved flexible shaft coupler which in itself causes an almost negligible power loss.

Still another object of the present invention is the provision of a flexible shaft coupler of the type described which provides for a minimum of contact area between rotating surfaces and which thereby generates very little heat.

Another object of the present invention is the provision of a flexible shaft coupler which facilitates lubrication of the rotating members.

These and other objects and advantages of the invention will become apparent from the following specification disclosing a preferred embodiment shown in the accompanying drawings.

DESCRIPTION OF THE PREFERRED EMBODIMENT

Figure 2:
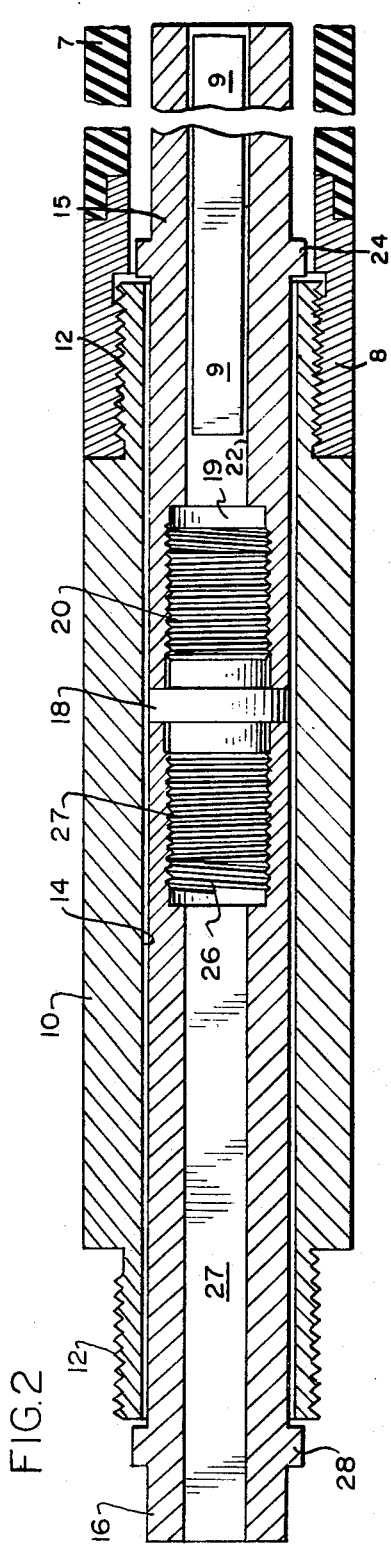
FIGURE 2 is an enlarged, longitudinal central section taken through the coupler.
Figure 1:
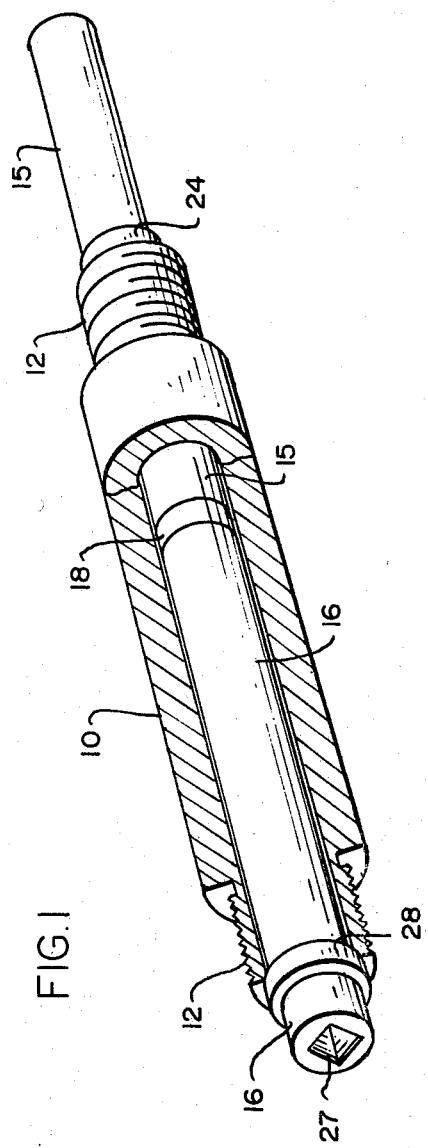
FIGURE 1 is a perspective view of a flexible shaft coupler according to the present invention with a portion of the housing being broken away for better illustration of the members contained therein.

The coupler includes an elongated, cylindrical housing 10. The housing has reduced-in-diameter formations 12 at its respective opposite ends, which formations are externally threaded for threading engagement with fittings attached to the ends of outer casings of a pair of flexible shafts. One of such shafts is shown in FIG. 2. It will be understood that said shafts are of the usual construction having an outer casing 7 connected to a fitting 8, which casing contains the flexible driving shaft 9. The housing 10 is hollow having a through bore 14 of uniform diameter.

A coupling member is rotatably received within the housing 10; this coupling member consists of a pair of coupling elements or tubes 15, 16 connected together at their adjacent ends by a fitting member 18. The coupling element 15 has at the inner end thereof a threaded bore 19 threadingly receiving a cylindrical, threaded portion 20 of the fitting 18. The member 15 also has a square in cross section bore 22 which extends completely through this member and opens into the bore 19. Finally, the coupling element 15 includes an external, annular flange 24.

In the embodiment shown for purposes of illustration, the coupling element 16 is virtually identical with the coupling element 15, the main difference residing in the respective lengths of these two elements. Coupling element 16 includes a threaded bore 26 threadingly engaged with a threaded, cylindrical end portion 27 of the fitting or connector 18. A square in cross section bore 27 extends completely through the member 16 opening into the bore 26. The coupling element 16 includes an external, annular flange 28.

The square in cross section bores 22, 27 receive the complementary shaped ends of the flexible driving shafts. Of course, the cross sectional shape of the bores 22, 27 could be hexagonal or of other multisided configuration to accommodate the shape of a particular driving shaft. The direction of the threads in the mores 19, 26 and on the portions 20, 27 of the fitting 18 is such that rotation imparted to either of the coupling elements 15 or 16 in a given direction will result in corresponding rotation being imparted to the other coupling element. In a preferred form, the driving shafts will extend substantially all of the way into the bores 22, 27 thereby to allow the driving shafts to move axially in the bores 22, 27 during bending of the flexible shafts but without the likelihood of the driving shafts being inadvertently withdrawn from the bores 22, 27.

The outside diameter of the coupling element 15 is identical with the outside diameter of the element 16. The diameter of these members is somewhat less than the inside diameter of the bore 14 as is readily apparent from FIGURE 2. The difference in diameter is such that the coupling elements 15, 16 are loosely received within the bore 14 for free rotation therein and for limited lateral movement therein. Axial movement of coupling elements 15, 16 in the bore 14 is limited by alternate abutting engagement of the flanges 24, 28 with respective opposite ends of the housing 10.

It will be understood that the engagement between outer surfaces of the coupling elements 15, 16 and the inside of the bore 14 serves as the only means rotatably supporting the elements 14, 16 in the housing. That is to say, no bearings of any type are used or required.

The aforesaid loose mounting of the coupling elements 15, 16 within the bore 14 results in a minimum contact between rotating surfaces thereby in turn resulting in a very minimum of frictional forces being developed during operation of the coupler. This feature eliminates heat problems and results in a very minimum of power loss from the coupler itself.

The exterior surfaces of the members 15, 16 and the bore 14 define an annular space extending for the full length of the housing 10 and opening at opposite ends of the latter. In this respect, it is noted that the flanges 24 and 28 are arranged such that only one of such flanges may abut an end of the housing 10 at any one time. When the coupler according to the present invention is in operative engagement with a pair of flexible shafts, the annular space just described is in substantial continuous communication with the spaces in the drive shafts between the outer casings and the flexible driving members. Accordingly, the lubricant contained in each drive shaft between the outer casing and the driving element may work its way to the housing 10 and into the annular space between the bore 14 and the members 15, 16. Of course, the coupler according to the present invention may itself be lubricated prior to connecting the same with the flexible shafts. At any rate, lubrication of the coupler according to the present invention is facilitated by reason of the fact that the annular space defined by the bore 14 and the members 15, 16 opens to the interiors of the flexible shafts.

It is thus seen that the present invention provides a new and improved coupler having the advantages set forth above. The coupler according to the present invention can be manufactured easily and inexpensively as the same has few parts and does not require close tolerances between the rotating members. As mentioned above, the coupler according to the present invention obviates the use of bearings which have heretofore always been included with prior art flexible shaft couplers.

We claim:

1. A coupler for connecting two flexible shafts of the type having an outer casing containing a flexible driving shaft therein, said coupler comprising, an elongated cylindrical housing having opposite ends thereof adapted for connection respectively with ends of the outer casings of a pair of flexible shafts, which housing has a longitudinally extending, through bore, an elongated cylindrical coupling member having its opposite ends adapted for respective driving engagement with the flexible driving shafts contained within said outer casings, respectively, said coupling member consisting of a pair of cylindrical elements detachably connected together at their adjacent ends, said coupling member being contained within said bore, the outside diameter of said coupling member being less than the diameter of said bore to an extent that the former is loosely received within the latter for free rotation therein and for lateral movement relative thereto, the engagement between the surface of said bore and outer surfaces of said coupling member serving as the sole means rotatably supporting the latter.

2. The coupler according to claim 1 further defined by, said housing having threaded formations at opposite ends thereof for threading engagement with fittings on said outer casings, respectively, each of said cylindrical elements of said coupling member having an external annular flange, said flanges being arranged for alternate abutting engagement with respective opposite ends of said housing thereby to limit axial movement of said coupling member relative to said housing, each of said cylindrical elements having at its other end a multisided bore for driving engagement with the associated driving shaft.

References Cited

UNITED STATES PATENTS

| 2,243,960 | 6/1941 | Hotchkiss | 64—4 |
| 2,586,359 | 2/1952 | Mall | 64—4 |
| 2,586,360 | 2/1952 | Mall | 64—4 |

JAMES A. WONG, Primary Examiner